United States Patent [19]
Yariv

[11] 3,967,213
[45] June 29, 1976

[54] X-RAY LASER WITH A SINGLE CRYSTAL WAVEGUIDE STRUCTURE

[75] Inventor: Amnon Yariv, San Marino, Calif.

[73] Assignee: California Institute of Technology, Pasadena, Calif.

[22] Filed: Mar. 5, 1975

[21] Appl. No.: 555,695

[52] U.S. Cl.......................... 331/94.5 C; 331/94.5 F
[51] Int. Cl.²............................................ H01S 3/16
[58] Field of Search..................... 331/94.5; 356/112

[56] References Cited
UNITED STATES PATENTS 3,484,721  12/1969  Bond et al..................... 331/94.5 C
3,760,292  9/1973  Kogelnik et al................ 331/94.5 C

OTHER PUBLICATIONS

Spiller et al., X-ray Laser Resonator, IBM Tech. Discl. Bul., vol. 16, No. 12, (May 1974), pp. 4093 and 4094.

Primary Examiner—William L. Sikes
Attorney, Agent, or Firm—Lindenberg, Freilich, Wasserman, Rosen & Fernandez

[57] ABSTRACT

An X-ray laser comprises a single crystal in the form of a thin film with an oriented set of prominent atomic planes so that when the crystal is pumped, X-ray photons which are emitted from one of the atomic constituents of the crystal, experience internal feedback (Bragg scattering) from the atomic planes thereby eliminating the need for external feedback. In addition the crystal functions as a thin planar waveguide confining the X-ray waves therein, thereby reducing the necessary pumping power and increasing overall efficiency.

10 Claims, 2 Drawing Figures

X-RAY LASER WITH A SINGLE CRYSTAL WAVEGUIDE STRUCTURE

BACKGROUND OF THE INVENTION

1. Field of the Invention:

The present invention generally relates to lasers and, more particularly, to an X-ray laser employing a single thin film crystal.

2. Description of the Prior Art:

The strong interest in the coherent generation and guiding of X-rays has led to many investigations relating to the problems of pumping atomic media to obtain laser amplification in the X-ray region, and to the problems of providing adequate X-ray resonators for the amplifying media. The present invention is directed to a new X-ray laser unlike any suggested in the prior art.

SUMMARY OF THE INVENTION

Briefly, the X-ray laser of the present invention comprises a single crystal in the form of a thin film which when pumped by power from an external pumping source, one of the crystal atomic constituents emits X-ray photons. The crystal is oriented in such a way so as to produce backward or nearly backward Bragg scattering, i.e., feedback, from a set of prominent atomic planes, which are substantialy normal to the plane of the crystal through which it is pumped, thereby eliminating the need for external feedback. The X-ray waves are confined to the thin film crystal, which acts as a waveguide for the X-ray waves, thereby reducing the necessary pumping power and increasing overall performance efficiency.

The novel features of the invention are set forth with particularity in the appended claims. The invention will best be understood from the following description when read in conjunction with the accompanying drawings.

DESCRIPTION OF THE PREFERRED EMBODIMENTS

The principles underlying the present invention will be explained in conjunction with FIG. 1. Therein, numeral 10 designates a crystal with a top plane 11 and a bottom plane 12. In practice, the crystal is grown on top of a substrate 15 as a very thin film of a thickness $t$.

Figure 1:
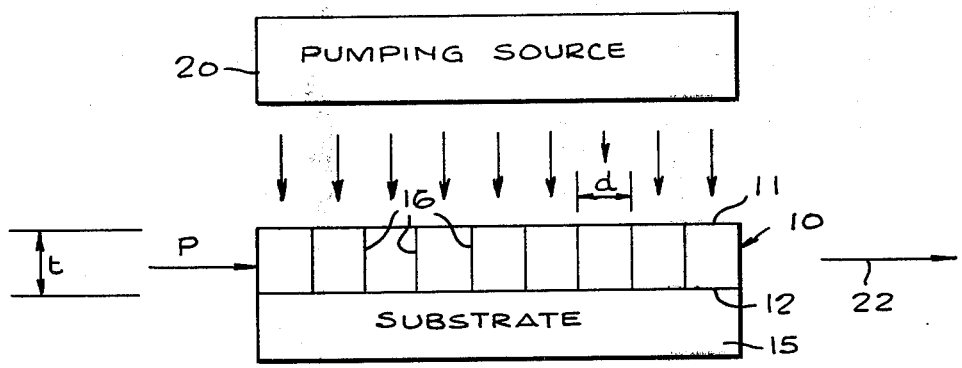
FIG. 1 is a diagram useful in explaining the principles of the invention, as well as one embodiment thereof.

The crystal 10 is grown so that a set of prominent atomic planes, designated by numerals 16, which extend along a selected crystallographic axis of the crystal, represented by numeral 18 in FIG. 1, are essentially normal to the top plane 11, and have a spacing $d$. The crystal is shown being pumped by power provided from an appropriate pumping source 20, such as electrons, X-rays, or intense laser radiation. The crystal is assumed to include as one of its constituents, atoms, which due to the crystal pumping produce X-ray photons (emmision) at a wavelength $\lambda$.

When a wavelength $\lambda$ and the spacing $d$ between the prominent atomic planes 16, hereinafter also referred to as the lattice spacing, are related by the expression $$d = (\lambda/2)m, \quad m=1,2,3 \ldots$$

generally referred to as the Bragg condition, Bragg-type reflections or coupling between the forward and backward waves of the photons travelling along axis 18, namely, backward Bragg scattering takes place, leading to distributed feedback. Such internal feedback eliminates the need for external feedback.

Whenever the Bragg condition is satisfied in crystal 10 to within an acceptable accuracy, generally a small fraction of one percent and with sufficiently intense pumping, coherent radiation, i.e., an X-ray beam 22 is emitted from one end of the crystal essentially in the direction of the crystallographic axis, along which the atomic planes 16 are spaced.

A promising class of crystals for us in an X-ray laser in accordance with the present invention is the class $\overline{4}3m$, also known as the cubic Zinc-Blende class. This class includes the crystal GaP. When crystal 10 is formed of GaP and is pumped one of the strong X-ray emissions is at a wavelength $\lambda = 6.154$A, and is due to $M \to L$ transition in the phosphorus (P). It is assumed that the GaP crystal is formed so that axis 18 represents the axis <111> of GaP. The lattice spacing along the axis <111> of GaP is $d(111) = a_o \sqrt{3} = 3.147$A, where $a_o$ is the unit cell dimension. In such a crystal the Bragg condition is satisfied only to within 2.2 percent, i.e., $[d(111) - \lambda/2]/d(111) = 2.2 \times 10^{-2}$. This discrepancy is too big to be tolerated. However, it may be solved in two ways.

Instead of growing crystal 10 as GaP it can be grown as a mixed epitaxial film of a crystal $Ga_{1-x}A_xP$ or $GaP_{1-x}B_x$, where A and B represent a third atomic constituent of the grown crystal. By controlling $x$, it is possible to reduce the average value of the unit cell dimension $a_o$. Consequently, it is possible to produce a lattice spacing with an average value of d which is adequate to satisfy the Bragg condition and thereby produce a coherent X-ray beam at $\lambda = 6.154$A. Techniques for growing mixed epitaxial films of Zinc-Blende crystals are at present highly developed. Therefore, producing a lattice spacing with an average value sufficient to satisfy the Bragg condition is within the state of the art.

Another technique of controlling or "fine-tuning" the Bragg condition when the lattice spacing does not satisfy the Bragg condition to a sufficient accuracy is by means of a waveguiding layer technique. This aspect of the invention will be explained in connection with FIG. 2. As seen therefrom in addition to the substrate 15, on which crystal 10 is grown, a superstrate 30 which is made very thin is deposited on top of the crystal.

Figure 2:
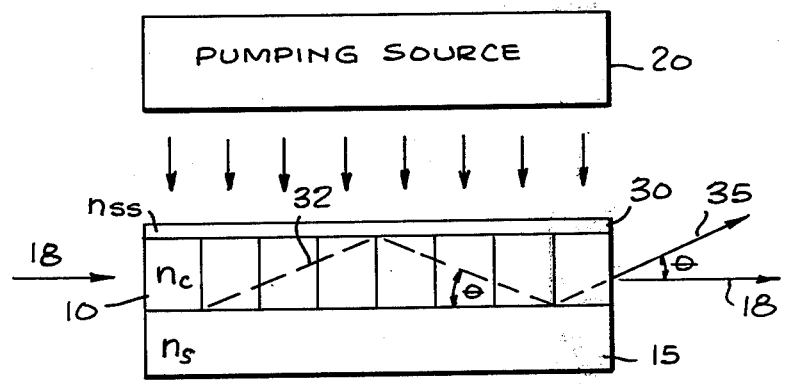
FIG. 2 is a diagram of another embodiment of the invention.

The indices of refraction of the crystal, the substrate and the superstrate are designated by $n_c$, $n_s$, $n_{ss}$ respectively, with $n_{ss} < n_c > n_s$. Since the crystal 10 has the highest index of refraction it acts as a waveguide, with total internal reflection or high reflectivity glancing incidence of the X-rays which follow zig-zag paths, one of which is shown in FIG. 2 and designated by dashed line 32. This causes the Bragg condition to become $$d \cos \theta = m(\lambda/2), \quad m=1,2,3 \ldots$$

where $\theta$ is the angle of incidence, as well as the angle at which the X-ray beans exit the crystal with respect to the axis along which the atomic planes are spaced.

From the theory of dielectric waveguides it can be shown that, $$\cos\theta \simeq 1 - (\lambda^2 s^2)/(8t^2) \quad s=1,2,3\ldots$$

where $t$ represents the crystal thickness and $s$ represents one of the allowable transverse modes.

The Bragg condition is satisfied at some crystal thickness $t$ and for some transverse mode $s$ such that $$d[1 - (\lambda s^2/8t^2)] = \lambda/2.$$

For the above example of GaP in which $d(111) = 3.147\text{A}$ and $\lambda = 6.145\text{A}$, the Bragg condition is satisfied, i.e., the 2.2 percent discrepancy is eliminated when $\cos\theta = 0.978 = 1 - (\lambda^2 s^2/8t^2)$.

Choosing $t \simeq 61.54\text{A}$ so that $\lambda/t \simeq 1/10$, $s=4$. This means that the fourth order transverse mode will satisfy the Bragg condition and will have minimum threshold, i.e., will oscillate first, experience maximum amplification and will produce an X-ray beam 35 which will exit the crystal at the angle $\theta$, which is on the order of 11°–12°. It should be appreciated that in this embodiment the X-ray photons experience nearly backward Bragg scattering.

In practice the crystal length may be on the order of 1mm or less, its width in the micron range, e.g., 10μ, while its thickness $t$ may be chosen to satisfy the Bragg condition as hereinbefore explained. It is believed that in most practical applications the thickness would not exceed $10^4\text{A}$.

From the foregoing, it is thus seen that the crystal 10 acts as a waveguide for the X-rays propagations therein. The substrate and the superstrate should be chosen to have a total electron (not free electron) density which is higher than in the crystal 10. This usually involves using higher Z elements. The substrate and superstrate may be produced from various materials, such as GaAs or GaSb.

From the foregoing it should thus be appreciated that in accordance with the present invention the crystal is oriented so that internal feedback or Bragg scattering is produced from a set of prominent atomic planes in the crystal. Thus, the need for laser external feedback is eliminated. Also, since the X-ray waves are confined to the very thin film crystal, which acts as a thin planar waveguide, it reduces the pumping power needed and thereby increases the overall efficiency.

As seen from FIG. 2, the superstrate is between the pumping source 20 and the crystal 10. In order not to interfere with the pumping the superstrate should be made very thin, on the order of 100A. If in spite of its thickness the superstrate is found to interfere with the pumping, it could be eliminated. In such a case glancing reflectance of the X-rays at the top surface would be due to the interface of the top surfaces with vacuum (or air) exhibiting an index of refraction less than $n_c$. The removal of the superstrate will introduce some loss, which can be made small by controlling $\lambda/t$ to be sufficiently small, e.g., 1/100.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A laser comprising:
    a thin elongated crystal of thickness t between top and bottom sides thereof, said crystal being characterized by a set of prominent atomic planes which are substantially normal to said top side and are spaced from one another by a spacing definable as $d$, along the crystal length, said crystal having an index of reflection definable as $n_c$ and atoms excitable to emit photons at a wavelength $\lambda$;
    a substrate in contact with and supporting said crystal at the bottom side thereof, said substrate having an index of refraction definable as $n_s$ where $n_c > n_s$;
    pumping means for pumping energy into said crystal through the top side thereof to excite said excitable atoms to emit said photons, said atomic planes providing Bragg scattering for at least some of said photons to produce a laser beam at wavelength $\lambda$ which exits said crystal, $d$ and $\lambda$ being related by the relationship $d \cos\theta = m(\lambda/2)$ where $m$ is an integer and $\theta$ is the angle at which said beam exits said crystal with respect to the direction along which said atomic planes are spaced.

2. The laser as described in claim 1 wherein $\lambda$ is in the X-ray region of the spectrum.

3. The laser as described in claim 2 wherein said crystal is of the $\bar{4}3m$ class.

4. The laser as described in claim 3 wherein said excitable atoms are phosphorus atoms which emit photons at $\lambda = 6.154\text{A}$ and wherein $t$ is less than 100A.

5. The laser as described in claim 1 further including a superstrate on the top side of said crystal said superstrate having an index of refraction definable as $n_{ss}$, where $n_c > n_{ss}$, with said pumping means pumping energy into said crystal through said superstrate.

6. The laser as described in claim 5 wherein $\lambda$ is in the X-ray region of the spectrum.

7. The laser as described in claim 6 wherein said crystal is of the $\bar{4}3m$ class and said excitable atoms are phosphorus atoms which emit photons at $\lambda = 6.154\text{A}$ and wherein $t$ is less than 100A.

8. A laser comprising:
    a thin elongated crystal of thickness t between top and bottom sides thereof, said crystal being characterized by a set of prominent atomic planes which are substantially normal to said top side and are spaced along from one another by an average spacing definable as $d$, along the crystal length, said crystal having an index of refraction definable as $n_c$ and atoms excitable to emit photons at a wavelength $\lambda$;
    a substrate in contact with and supporting said crystal at the bottom side thereof, said substrate having an index of refraction definable as $n_s$, where $n_c > n_s$; and
    pumping means for pumping energy into said crystal through the top side thereof to excite said excitable atoms to emit said photons, said atomic planes providing Bragg scattering for at least some of said pbotons to produce a laser beam at wavelength $\lambda$ which exits said crystal, $d$ and $\lambda$ being related by the relationship $d = m(\lambda/2)$ where $m$ is an integer, and said beam exits said crystal in a direction substantially parallel to the direction along which said atomic planes are spaced.

9. The laser as described in claim 8 wherein $\lambda$ is in the X-ray region of the spectrum.

10. The laser as described in claim 9 wherein said excitable atoms are phoshorus atoms which emit photons at $\lambda = 6.154\text{A}$.

* * * * *

UNITED STATES PATENT OFFICE
CERTIFICATE OF CORRECTION

PATENT NO. : 3,967,213
DATED : June 29, 1976
INVENTOR(S) : Amnon Yariv

It is certified that error appears in the above-identified patent and that said Letters Patent are hereby corrected as shown below:

Column 3, line 50, delete "thickness" and insert --thinness--.

Column 4, line 56, (Claim 8), "pbotons" should be --photons--.

Signed and Sealed this

Fourteenth Day of September 1976

[SEAL]

*Attest:*

RUTH C. MASON
*Attesting Officer*

C. MARSHALL DANN
*Commissioner of Patents and Trademarks*